3,583,927
Patented June 8, 1971

3,583,927
CHEMILUMINESCENT PROCESS AND MATERIAL
Gordon Schlesinger, Canoga Park, Calif., assignor to
TRW Inc., Redondo Beach, Calif.
No Drawing. Filed May 31, 1967, Ser. No. 642,342
Int. Cl. C09k *1/00, 1/04, 1/52*
U.S. Cl. 252—188.3                          2 Claims

ABSTRACT OF THE DISCLOSURE

This invention relates to an inexpensive, non-toxic, storable chemiluminescent material produced by the reaction of calcium disilicide and a halogen-containing carboxylic acid reactants. The halogen containing carboxylic acid reactant may be a halogen substituted carboxylic acid or a mixture of an inorganic halogen acid and a carboxylic acid. A reactivatable, high intensity colored light is produced when the chemiluminescent material is mixed with an oxidizer solution.

---

The invention herein described was made in the course of, or under a contract or subcontract thereunder, with the Department of Army.

This invention relates to new chemiluminescent materials which are related to the family of chemiluminescent materials described in co-pending application Ser. No. 468,231, filed June 28, 1965, now pending.

In the prior art, as taught by H. Kautsky in "Zietschrift Fur Anorganische Chemie," volume 117, page 209 (1921), and by H. Kautsky and H. Zocher in "Zietschrift Fur Physik," volume 9, page 269 (1921), chemiluminescent material was produced by reacting calcium disilicide with hydrochloric acid in an ethanol solution. Chemiluminescent light was produced by mixing the chemiluminescent materials so produced with an oxidizer. While such chemiluminescent systems were interesting, practical applications were discouraging because light could not be produced unless the two components were mixed in controlled proportions by technically trained or experienced personnel.

In general, according to this invention new chemiluminescent materials may be produced by the direct synthesis reaction between calcium disilicide and halogen-containing carboxylic acid reactants. When one of these chemiluminescent products is mixed with an oxidizer, bright colored light is produced which may be reactivated several times by the remixing of the two components.

The use of different halogen-containing carboxylic acids in the synthesis procedure leads to production of chemiluminescent powders which are capable of producing colored light. In the examples described below colored lights of pure green, green-yellow and deep orange can be produced by the chemiluminescent powders.

Preparation of the chemiluminescent fuel materials may be effected simply by mixing measured amounts of calcium disilicide and the selected halogen-containing carboxylic acid reactant. A sufficient amount of the halogen-containing carboxylic acid aqueous reactant is added to the granular calcium disilicide to provide a slurry which may be stirred with ease. The slurry is constantly stirred for a time sufficient to allow the initial reaction to proceed to substantial completion, and then boiling distilled water is added to the reaction vessel to hydrolyze the product of the reaction. The chemiluminescent material which forms by the hydrolysis reaction is filtered and washed several times with distilled water. Purity may be further improved by subsequent washes with organic solvents such as ethanol and ether.

The halogen containing carboxylic acid reactant for purposes of this invention, includes all halogen substituted lower carboxylic acids, i.e., $C_2$ to $C_5$ carboxylic acids. Additionally, aqueous solutions containing an inorganic halogen acid such as hydrofluoric acid, hydrochloric acid, hydrobromic acid, and hydroiodic acid, and a lower unsubstituted carboxylic acid may be used rather than the substituted compound. More specifically any of the following compounds, including the isomeric forms, have been found to be suitable:

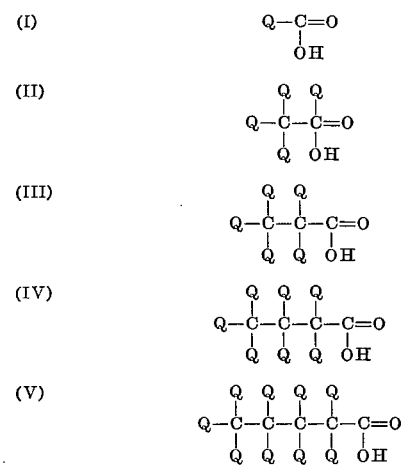

wherein Q represents hydrogen, chlorine, fluorine, iodine or bromine substituents.

Alternative to the above listed acids, solutions of unsubstituted carboxylic acids and uncombined halogenic acids may be used. For example, the following acids may be used in various combinations, preferably in ratios of twenty parts of the organic acids to one part of the halogenic acid.

Organic acids:
    Formic acid
    Acetic acid
    Propanoic acid
    Butanoic acid
    Pentanoic acid
Halogenic acids:
    Hydrofluoric acid
    Hydrochloric acid
    Hydrobromic acid
    Hydroiodic acid The following examples will better illustrate the synthesis steps of the chemiluminescent materials.

EXAMPLE I 250 grams of monochloroacetic acid were dissolved in 1000 milliliters of distilled water and reacted with 50 grams of calcium disilicide for twenty minutes constant stirring. Two thousand milliliters of boiling distilled water were added to the solid material to effect a hydrolysis reaction. After the hydrolysis had proceeded for approximately twenty minutes, the solid material was filtered off in a Buchner funnel and washed with three separate 500 milliliter rinses of cold distilled water followed by two rinses of 250 milliliters of ethanol and finally by two rinses with 250 milliliters of ethyl ether. The ether was then evaporated from the powder by applying suction for several minutes. The material produced by this procedure chemiluminesced upon oxidation with aqueous ceric ammonium sulfate with a deep green light.

EXAMPLE II

An acid solution was prepared by mixing 80 ml. of concentrated hydrochloric acid with 400 ml. of concentrated acetic acid and diluted to 1000 ml. with distilled water. The solution was added to 50 grams of calcium disilicide and constantly stirred for approximately twenty minutes. Hydrolysis, wash and separation were performed as described in Example I. The resulting material chemiluminesced upon oxidation with aqueous ceric ammonium sulfate solution to produce a yellow-green light.

EXAMPLE III

An acid solution was prepared by mixing 67 grams of α-bromoisobutyric acid in 500 ml. of distilled water. The solution was added to 25 grams of calcium disilicide and constantly stirred for approximately twenty minutes. Hydrolysis, wash, and separation were performed as described in Example I. The resulting material chemiluminesced upon oxidation with aqueous ceric ammonium sulfate solution to produce a yellow orange light.

EXAMPLE IV

An acid solution was prepared by mixing 250 grams trichloracetic acid in 1000 ml. of distilled water. The solution was added to 50 grams of calcium disilicide and constantly stirred for approximately twenty minutes. Hydrolysis, wash, and separation were performed as described in Example I. The resulting material chemiluminesced upon oxidation with aqueous ceric ammonium sulfate solution to produce a deep orange light.

The chemiluminescent light may be produced by mixing the materials produced as described above with any of several inorganic oxidizers, such oxidizers being used as aqueous solutions, gels, or powders. Inorganic oxidizers such as ceric ammonium nitrate, ceric ammonium sulfate, ceric oxide, ceric sulfate, chromium trioxide, ferric chloride, potassium hexanitrate cerate, potassium permanganate, potassium ruthenate, and uranyl sulfate have been employed to cause chemiluminescense; ceric ammonium sulfate has been found to be the most effective. A change of oxidizer apparently has no effect on the color of the light emitted, but it does influence the brilliance and duration of the light.

So that the chemiluminescent materials and oxidizers can be handled and used expediently, packaging or encapsulation means which will permit mixing upon the proper occasion or command is necessary. Although numerous packaging or encapsulation configurations may be used, e.g., two thin walled concentric capsules, with one containing the oxidizer and the other containing the chemiluminescent material or a system in which the oxidizer and the chemiluminescent material may be fed from separate containers into a blending nozzle and sprayed, all of them are deemed to be suitable providing they permit rapid and thorough mixing upon the proper occasion.

Encapsulation or packaging can be accomplished with a variety of materials, such as metal, rubber, or plastic. Plastics, such as tetrafluoroethylene, polycarbonate resins, polyethylene terephthalate, are generally preferred because they are substantially inert with respect to the oxidizer and the chemiluminescent material. Glass or rubber may also be used. Regardless of the material which is being used, the wall structure and configuration must be such that the containers can be readily ruptured to permit mixing of the oxidizer and the chemiluminescent materials. Thin-walled metal containers are also suitable, however, special precautions must be taken to protect the metal which sometimes reacts with oxidizer solutions. Suitable protection for the metal containers may be simply a thin glass or plastic coating inside the container.

While the chemiluminescent agent and/or the oxidizing agent can be used in a solid state, gels and viscous glycerine-water phases were found to be effective in prolonging the light emission of the systems through diffusion control. A gelling medium which has been found particularly suitable is Cab-O-Sil M–5 manufactured by the Cabot Corporation. Cab-O-Sil is a fire-dry pyrogenic silica with a particle size of about 0.015 micron, a surface area of 200 m.$^2$/gm., and a bulk density of 2.2 lb./ft.$^3$. Water gels made from these active silica are thixotropic so that they lose viscosity and flow when agitated, beaten, or otherwise admitted to a shearing action. Accordingly, the gels set after mixing which assist in the encapsulation of the materials, but upon the rupture of the capsules, a shearing force is produced causing the gels to flow.

In order to obtain the greatest intensity of chemiluminescent activity, a high loading of chemiluminescent material per unit weight of gel is required. Thus, although the highest possible concentration of active ingredients per unit weight of gel would seem to be the most advisable, a high percentage of solid material renders the gel highly viscous and results in a decrease in the diffusion-controlled chemiluminescent reaction rate. Thus, for optimum results, a balance must be made between the brightness and the light-emitting duration.

Numerous other aqueous gels, such as polyvinyl alcohol-borax may be used in the practice of this invention. The main problem in the use of a gel, is to select one which will gel in an acid environment. Generally the chemiluminescent materials have a pH of about 1 because of traces of the acid remaining from the production of the chemiluminescent material, and therefore a material which will gel in an acid environment is required.

One of the more attractive features of these inexpensive, non-toxic chemiluminescent systems is that they may be reactivated. By suitable formulation with gelling agents, a peak brightness occurs within seconds after mixing of the chemiluminescent material and the oxidizer with a gradually diminishing light lingering for a period up to as long as 5 minutes under proper conditions. Remixing of the chemiluminescent material and the oxidizer will reactivate the light to a brilliance somewhat less than the original peak brightness. The mixing may be repeated several times, with each time producing a diminished peak brightness from the time before.

I claim:

1. A process for the production of chemiluminescent light comprising:
   (A) reacting (1) calcium disilicide with (2) a reactant selected from the group consisting of a halogen substituted aliphatic carboxylic acid having 1 to 5 carbon atoms per molecule and a mixture of (i) and (ii) wherein (i) is an acid selected from the group consisting of formic, acetic, propanoic, butanoic, and pentanoic acids and wherein (ii) is an acid selected from the group consisting of hydrofluoric acid, hydrochloric acid, hydrobromic acid, and hydroiodic acid, and
   (B) mixing (3) an inorganic oxidizer selected from the group consisting of ceric ammonium nitrate, ceric ammonium sulfate, ceric oxide, ceric sulfate, chromium trioxide, ferric chloride, potassium hexanitrate cerate, potassium permanganate, potassium ruthenate, and uranyl sulfate.

2. A chemiluminescent composition consisting essentially of:
   (A) a reaction product of (1) calcium disilicide and (2) a reactant selected from the group consisting of a halogen substituted aliphatic carboxylic acid having 1 to 5 carbon atoms per molecule and a mixture of (i) and (ii) wherein (i) is an acid selected from the group consisting of formic, acetic, propanoic, butanoic, and pentanoic acids and wherein (ii) is an acid selected from the group consisting of hydrofluoric acid, hydrochloric acid, hydrobromic acid, and hydroiodic acid which produces light upon mixing with (B) an inorganic oxidizer selected from the group consisting of ceric ammonium nitrate, ceric ammonium sulfate, ceric oxide, ceric sulfate, chromium trioxide, ferric chloride, potassium hexanitrate cerate, potassium permanganate, potassium ruthenate, and uranyl sulfate.

No references cited.

JOHN D. WELSH, Primary Examiner

U.S. Cl. X.R.

250—71; 252—301.2